Oct. 12, 1971  ISAO HISHIKARI  3,611,805
RADIATION THERMOMETER
Filed July 28, 1969
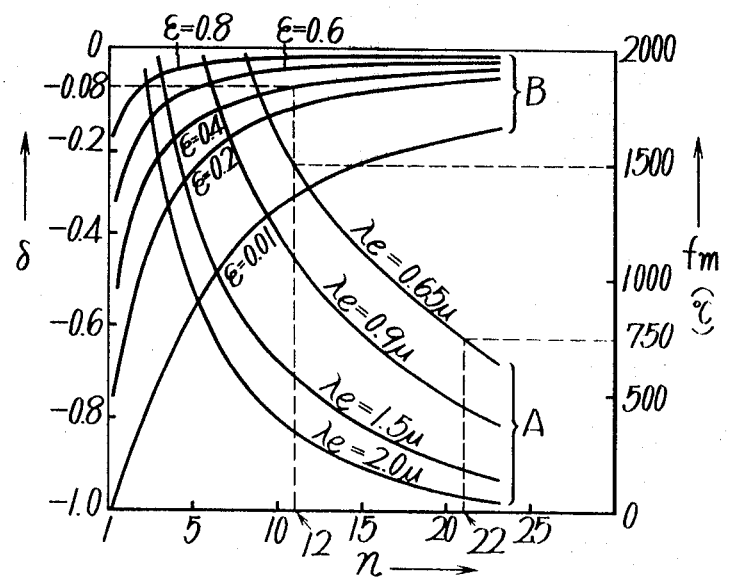
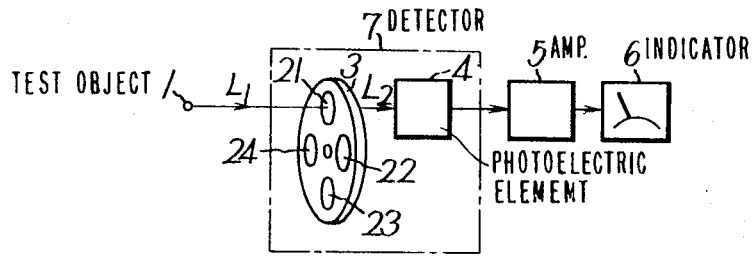
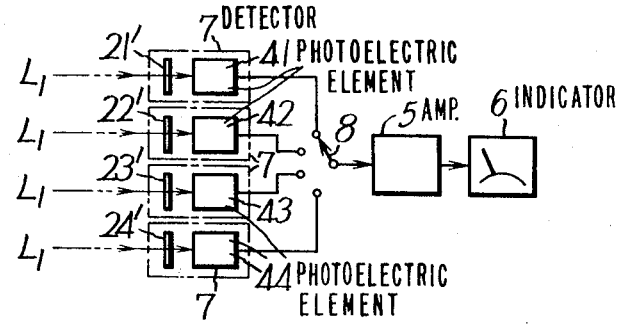
INVENTOR.
ISAO HISHIKARI
ATTORNEYS United States Patent Office 3,611,805
Patented Oct. 12, 1971

3,611,805
RADIATION THERMOMETER
Isao Hishikari, Tokyo, Japan, assignor to Kabushikikaisha Chino Seisakusho (Chino Works, Ltd.), Tokyo, Japan
Filed July 28, 1969, Ser. No. 845,301
Int. Cl. G01j 5/08, 5/60
U.S. Cl. 73—355 R        3 Claims

ABSTRACT OF THE DISCLOSURE

A radiation thermometer having a detector including a photoelectric conversion element converting energy radiated from an object to be measured into a corresponding electric signal and an optical filter means passing some components of the energy having a predetermined wavelength range, a detector having the spectral sensitivity corresponding to the effective wavelength of the energy, and temperature indicating means for indicating the temperature of the object.

BACKGROUND OF THE INVENTION

Field of the invention

The present invention relates to an apparatus which measures the temperature of an object by utilizing energy emitted from the object and more particularly to a radiation thermometer including a photoelectric conversion element which detects temperature of the object by converting the energy radiated from the object into an elecrical signal and utilizing the electric signal.

Description of the prior art

Thermometers utilizing radiation energy emitted from an object are well known to those skilled in the art which utilize a disappearing filament type optical pyrometer. Other thermometers use a photoelectric conversion element and are called photoelectric thermometers. Photoelectric thermometers have an advantage over the disappearing filament type because they measure relatively low temperatures of the object and can continuously measure the temperature of the object. However, photoelectric thermometers have the disadvantage that they are not as reliable as the disappearing filament type. This is because only a small amount of data relating to indication errors based on the emissivity of the object to be measured, as is available with the photoelectric type compared to the disappearing filament type. Also the same photoelectric conversion element is used for measuring the temperature of the object over an unlimited wide range.

SUMMARY OF THE INVENTION

One object of the present invention is to provide a radiation thermometer which measures temperature of an object in a range substantially the same as that of the conventional optical pyrometer and also measures temperatures in a range lower than that of the conventional optical pyrometer with high reliability.

Another object of the present invention is to provide a radiation thermometer which measures temperature with great accuracy such that errors between the measured value and the true value is as small as that of the conventional optical pyrometer.

BRIEF DESCRIPTION OF THE DRAWINGS

FIG. 1 is a characteristic graph for explaining the present invention;

FIG. 2 is a schematic block diagram illustrating one example of a radiation thermometer according to the present invention; and FIG. 3 is a schematic block diagram illustrating another example of the present invention.

DESCRIPTION OF THE PREFERRED EMBODIMENTS

The theory of the present invention follows. The quantity of energy at the wavelength $\lambda$ emitted from the unit area of the surface of a black body at the absolute temperature $T°K$ in unit time is $N(\lambda, T)$, and the quantity of the energy in the vicinity of an absolute temperature $T°K$ can be approximately represented by the following Equation 1:

$$N(\lambda,T) = kT^n \quad (1)$$

where $k$ is a constant and $n$ a temperature index of brightness.

For a grey body which has the true absolute temperature of $Tm°K$, an emissivity of $\epsilon$ and a measured apparent temperature of $Ts°K$ (in absolute temperature), the following Equation 2 can be obtained from the Equation 1:

$$\epsilon K T m^n = k T s^n \quad (2)$$

If the relative error of the measured temperature $Ts°K$ with respect to the true temperature $Tm°K$ is $\delta$, the relative error $\delta$ is defined by Equation 3 which is obtained from Equation 2:

$$\delta = \frac{Tm - Ts}{Tm} = 1 - \sqrt[n]{\epsilon} \quad (3)$$

Equation 3 shows that as the temperature index $n$ of the brightness increases, the relative error $\delta$ approaches zero, and the apparent temperature $Ts$ approaches the true temperature $Tm$.

The temperature index $n$ of brightness is defined by Equation 4 obtained from the Planck's equation:

$$n = \frac{C_2}{\lambda Tm} \cdot \frac{1}{1 - e^{-\frac{C_2}{\lambda Tm}}} \quad (4)$$

Equation 4 shows that if the unit wavelength $\lambda$ is constant, the temperature index $n$ of the brightness becomes smaller with increase of the true temperature $Tm$ of the object to be measured. Also if the true temperature $Tm$ remains constant, the temperature index $n$ of the brightness increases as the unit wavelength $\lambda$ becomes shorter.

Thus if the spectral sensitivity of a detector used for detecting energy emitted from an object based upon the above theorem is limited within a narrow wavelength range represented by an effective wavelength $\lambda e$ and the temperature range measured by the detector having the effective wavelength $\lambda e$, so that the temperature index $n$ of the brightness is restricted to a constant range, a relative error (indication error factor) $\delta$ can be maintained within a predetermined range. The graph shown in FIG. 1 illustrates the relationships set forth above, in which the left ordinate represents the relative error $\delta$, the right ordinate measured temperature $tm°C (= Tm - 273° C.)$ and the abscissa the temperature index $n$ of the brightness.

The relationship between the measured temperature $tm$ and the index $n$ and the effective wavelengths $\lambda e$ is indicated by curves identified by A. The relationship between the index $n$ and the relative error $\delta$ with the emissivity $\epsilon$ is indicated by the curves B.

In the conventional optical pyrometer, it is conventional that when the effective wavelength $\lambda e$ is 0.65 micron ($\mu$m.), the measuring temperature range is about 750 to 1500° C. If the conventional optical pyrometer is used for measuring a temperature higher than 1500° C., a neutral density optical filter is employed for partially absorbing energy emitted from the object to be measured to bring the energy into the above standard temperature range. The graph in FIG. 1 shows that if this temperature range is referred to the curve group A that, the temperature index $n$ of the brightness falls in the range between 22 to 12. When the pyrometer is used within this range, the maximum indication error (factor) is only —8% even if the emissivity is 0.4. This figure also shows that, where a detector having a spectral sensitivity different from the optical pyrometer in the effective wavelength $\lambda e$ is used within a temperature range different from 750–1500° C. that if temperature range to be measured is limited within the range of 22 to 12 of the temperature index $n$ of the brightness, that the indication error obtained will be similar to that obtained with an optical pyrometer.

The present invention utilizes this theorem, to provide a radiation thermometer in which the effective wavelength of the detector used can be selected according to the temperature range to be measured.

FIG. 2 is a schematic block diagram for illustrating one example of radiation thermometers according to the present invention. In the figure, reference numeral 1 designates an object the temperature of which is to be measured. Reference numeral 7 represents a detector which consists of a photoelectric conversion element 4 and a plurality of optical filters 21 to 24. The effective wavelength of the detector 7 is changed primarily by changing the spectral characteristic of each of the optical filters 21 to 24. One practical embodiment of the optical filters is a multi-layer interference optical filter. In an example, the optical filters are so selected that the effective wavelengths of energy which pass through the optical filters are, respectively, 2 $\mu$m., 1.5 $\mu$m., 0.9 $\mu$m. and 0.65 $\mu$m. As one example of the photoelectric conversion element 4, a photoelectric element made of PbS is employed. The photoelectric element has a substantially consist sensitivity for energy with wavelengths in the range of 0.5 to 2.5 $\mu$m. The optical filters 21 to 24 are respectively supported by a rotary filter holder 3 at a predetermined angular distance and disposed ahead of the photoelectric conversion element 4 with respect to the object 1. The energy radiated from the surface of the object 1 is applied to the photoelectric conversion element 4 through one of the optical filters (in the example shown in FIG. 2 the optical filter 21). The electric resistance value of the photoelectric conversion element 4 is changed in accordance with the quantity of the energy received by the element 4 and the element 4 provides an electrical output signal which varies as the resistance value of the element 4. The electrical output signal from the element 4 is supplied to an electric amplifier 5 and amplified. The amplified electrical signal from the amplifier 5 is supplied to an indicator 6 which has a temperature scale corresponding to the effective wavelenghts of the detector 7. The effective wavelength of the detector 7 is changed with the range of temperature to be measured by selecting one of the optical filters 21 to 24. For example, when the temperature range to be measured is 50° C.~300° C. the optical filter 21 of the detector 7 is selected for passing the effective wavelength $\lambda e$ of 2 $\mu$m. When the temperature range is 300° C.~500° C. the optical filter 22 is selected for changing the effective wavelength $\lambda e$ of the detector 7 to be 1.5 $\mu$m., when the range is 500° C.~1000° C. the optical filter 23 is used for causing the effective wavelength of the detector 7 to be 0.9 $\mu$m., and when the range is 1000°~1500° C. the optical filter 24 is employed for making $\lambda e$ to be 0.65 $\mu$m. Thus, the apparatus shown in FIG. 2, allows the effective wavelength $\lambda e$ of the detector 7 to be selected suitable for the temperature range to be measured and for always retaining the measuring operation within the range of 22–12 of the temperature index $n$ of the brightness. The relationship of the measured temperature range, the optical filters used, the characteristics of the filters and the effective wavelengths is shown in the following Table I.

TABLE I

| Temperature range to be measured | Optical filter | Center wavelength, $\mu$m. | Bandwidth, $\mu$m. | Effective wavelength ($\lambda e$), $\mu$m. |
|---|---|---|---|---|
| 50~300° C | 21 | 2.0 | 0.1 | 2.0 |
| 300~500° C | 22 | 1.5 | 0.1 | 1.5 |
| 500~1,000° C | 23 | 0.90 | 0.1 | 0.90 |
| 1,000~1,500° C | 24 | 0.65 | 0.1 | 0.65 |

FIG. 3 illustrates another example of the radiation thermometers according to the present invention in which similar reference numerals to those of FIG. 2 show the similar components. In this embodiment optical filters are employed such that the spectral characteristic of the detector 7 is dependent upon the optical filters. One practical example of such optical filter is a colored glass. That is, glasses of different colors 21', 22', 23' and 24' are employed each having spectral characteristic different from one another. Each of the colored glass filters 21', 22', 23' and 24' is connected to one of photoelectric conversion elements 41, 42, 43 and 44. In FIG. 3, reference numeral 8 designates a switch which is inserted between the output terminals of the elements 41–44 and the amplifier 5. A selected element 41–44 consisting of the colored glass filter and the photoelectric conversion element is selected by switch 8 for the temperature range to be measured. The relationship between the temperature ranges to be measured and the components used in the detectors is given in the following Table II.

TABLE II

| Temperature range | Optical filter | Photoelectric conversion element | Effective wave length $\mu$m. |
|---|---|---|---|
| 50~300° C | Very deep red colored glass. | Photoconductive element of PbS. | 2 |
| 300~500° C | Deep red colored glass. | Phototransistor made of Ge. | 1.5 |
| 500~1,000° C | Red colored glass. | Photoelectric element of Si. | 0.9 |
| 1,000~1,500° C | Light blue colored glass and red colored glass. | Photoelectric element of Se. | 0.65 |

Both the radiation thermometers illustrated in FIGS. 2 and 3 can measure temperature over a wide range and provides means for changing the effective wavelengths. However, the invention is not limited to the specific means illustrated. Measurements with the radiation thermometer of the present invention may be made with a single detector having a spectral sensivity of narrow wavelength range and with a single indication scale for indicating the temperature of a constant range according to an effective wavelength of the detector.

In the present invention since the spectral sensitivity of the detector is responsive to a narrow range of the effective wavelength $\lambda e$ the range of the temperature to be measured is limited within the range of 12 to 22 of the temperature index $n$ of the brightness of the radiation energy. Thus, the relative error of the indication of the present invention which is caused from the emissivity of the object to be measured can be made as small as that of the conventional optical pyrometer. Further, according to the present invention continuous measurements of temperature can be made, which is never possible with the conventional pyrometer.

I claim as my invention:

1. A radiation thermometer for a test object comprising an optical filter means including a plurality of optical interference filters each having different pass-band characteristics and capable of passing therethrough some components of energy emitted from said test object and having a predetremined wavelength range, a detector consisting of a photoelectric conversion element receiving the energy passed through the optical filter means to convert the energy into corresponding electric signals, the detector responsive to all of the energy passed through each of the plurality of optical interference filters to generate corresponding electric signals, and temperature indicating means supplied with the energy from the detector for indicating temperature and the temperature indication range of the temperature indicating means being limited to substantially a range of 12 to 22 of temperature index $n$ of the brightness in accordance with the effective wavelength of the detector, $n$ being determined by the equation $$n = \frac{C_2}{\lambda Tm} \cdot \frac{1}{1 - e - \frac{C_2}{\lambda Tm}}$$

where $C_2$ is a constant, $\lambda$ wavelength of the energy and $Tm$ the true absolute temperature of a grey body.

2. A radiation thermometer as claimed in claim 1, wherein an amplifier is inserted between the detector and the temperature indicating means for amplifying the output signal from the detector, whereby the sensitivity of the thermometer can be increased.

3. A radiation thermometer for a test object comprising an optical filter means including a plurality of optical interference filters each having different pass-band characteristics and capable of passing therethrough some components of energy emitted from said test object and having a predetermined wavelength range, a detector consisting of a photoelectric conversion element receiving the energy passed through the optical filter means to convert energy into corresponding electric signals, the detector responsive to all of the energy passed through all of the plurality of optical interference filters to generate corresponding electric signals, and temperature indicating means supplied with the energy from the detector for indicating temperature and the temperature indication range of the temperature indicating means being limited to substantially a range of 12 to 22 of temperature index $n$ of the brightness in accordance with the effective wavelength of the detector, $n$ being determined by the equation $$n = \frac{C_2}{\lambda Tm} \cdot \frac{1}{1 - e - \frac{C_2}{\lambda Tm}}$$

where $C_2$ is a constant, $\lambda$ wavelength of the energy and $Tm$ the true absolute temperature of a grey body, wherein the optical filter means includes a plurality of colored glass filters each of which pass different wavelengths of energy and the photoelectric conversion element comprises a plurality of photoelectric conductive elements each having a spectral characteristic different from one another, and each of the plurality of colored glass filters mounted to pass energy to one of the plurality of photoelectric conductive elements and a switching means is inserted between the output terminals of he photoelectric conductive elements and the input side of the temperature indication means to select one of the pair of the colored glass filters and one of the photoelectric conductive elements.

References Cited
UNITED STATES PATENTS

| | | | |
|---|---|---|---|
| 3,195,398 | 7/1965 | Shaw | 73—355 X |
| 3,264,931 | 8/1966 | Ackerman et al. | 73—355 X |
| 3,269,255 | 8/1966 | Shaw | 73—355 X |

OTHER REFERENCES

Hecht, G. J. A Two-Wavelength Near Infrared Pyrometer. In Temperature: It's Measurement and Control in Science and Industry, Vol. 3, part 2. pp. 407–8 (relied upon). Reinhold, N.Y., 1962.

LOUIS R. PRINCE, Primary Examiner
F. SHOON, Assistant Examiner

U.S. Cl. X.R.
356—43, 45